(12) United States Patent
Berard

(10) Patent No.: US 6,837,950 B1
(45) Date of Patent: Jan. 4, 2005

(54) SEPARATION OF FLOOR COVERING COMPONENTS FOR RECYCLING

(75) Inventor: Raymond A. Berard, Kennesaw, GA (US)

(73) Assignee: Interface, Inc., Atlanta, GA (US)

( * ) Notice: Subject to any disclaimer, the term of this patent is extended or adjusted under 35 U.S.C. 154(b) by 0 days.

(21) Appl. No.: 09/830,523

(22) Filed: Jul. 20, 2001

Related U.S. Application Data

(60) Provisional application No. 60/107,208, filed on Nov. 5, 1998.

(51) Int. Cl.[7] .................... B32B 35/00; B32B 5/04; D05C 15/00; C08J 11/18; C08F 299/06
(52) U.S. Cl. .................... 156/94; 156/72; 156/247; 156/344; 428/85; 428/95; 428/96; 521/49; 521/49.5; 524/589; 525/454
(58) Field of Search .................... 156/60, 72, 230, 156/231, 247, 344, 94; 428/85, 91, 95, 96, 97; 442/48; 521/49, 49.5; 524/589, 590; 525/415, 440, 454

(56) References Cited

U.S. PATENT DOCUMENTS

| | | |
|---|---|---|
| 4,110,266 A | 8/1978 | Sheratte .................... 260/2.3 |
| 4,159,972 A | 7/1979 | Braslaw et al. .................... 260/2.3 |
| 4,316,992 A | 2/1982 | Gerlock et al. .................... 568/621 |
| 4,317,939 A | 3/1982 | Gerlock et al. .................... 568/121 |
| 4,339,358 A | 7/1982 | Schültz .................... 521/49.5 |
| 4,657,790 A * | 4/1987 | Wing et al. .................... 427/374.1 |
| 4,981,876 A | 1/1991 | Grimmer .................... 521/46.5 |
| 5,096,764 A * | 3/1992 | Terry et al. .................... 428/95 |
| 5,120,768 A | 6/1992 | Sisson .................... 521/46.5 |
| 5,160,354 A | 11/1992 | Ascough .................... 55/37 |
| 5,204,155 A | 4/1993 | Bell et al. |
| 5,230,473 A | 7/1993 | Hagguist et al. .................... 241/3 |
| 5,246,116 A | 9/1993 | Kirk .................... 209/3 |
| 5,475,036 A | 12/1995 | Hosoyama et al. .................... 521/40 |
| 5,534,556 A * | 7/1996 | Bauer .................... 521/49 |
| 5,605,935 A * | 2/1997 | Parrinello et al. .................... 521/49.5 |
| 5,635,542 A | 6/1997 | Münzmay et al. .................... 521/49.5 |
| 5,648,431 A | 7/1997 | Demuth et al. .................... 525/415 |
| 5,653,867 A | 8/1997 | Jody et al. .................... 209/164 |
| 5,691,389 A | 11/1997 | Parrinello et al. .................... 521/49.5 |
| 5,714,523 A | 2/1998 | Hopper et al. .................... 521/49.5 |
| 5,722,603 A | 3/1998 | Costello et al. .................... 241/20 |
| 5,763,036 A | 6/1998 | Terry et al. |
| 5,840,773 A * | 11/1998 | Booij et al. .................... 521/49 |
| 5,879,608 A | 3/1999 | Lammeck et al. .................... 264/239 |

FOREIGN PATENT DOCUMENTS

| | | | | |
|---|---|---|---|---|
| GB | 1552626 | * | 9/1979 | ............ D06N/7/00 |
| WO | WO 99/19557 A1 | | 4/1999 | |

* cited by examiner

Primary Examiner—J. A. Lorengo
(74) Attorney, Agent, or Firm—Kilpatrick Stockton LLP; John S. Pratt; Bruce D. Gray

(57) ABSTRACT

The invention relates to methods for processing floor coverings (100), such as carpet and/or carpet tile, having at least one layer containing a polyurethane (104), such that at least this polyurethane—containing layer (104) can be recycled and reused. The method involves contacting the floor covering (100) with an organic polyol (110) and heating (120) it, so that the polyurethane—containing layer (104) softens and/or partially liquefies, but can be resolidified by contact with additional polyisocyanate (140).

14 Claims, 2 Drawing Sheets

US 6,837,950 B1

SEPARATION OF FLOOR COVERING COMPONENTS FOR RECYCLING

This application is a 371 of PCT/U899/25757 filed Nov. 5, 1999 which claims benefit of the filing date of U.S. provisional application Ser. No. 60/107,208, filed Nov. 5, 1998.

BACKGROUND OF THE INVENTION

1. Field of the Invention

This invention relates to methods for recycling floor coverings, such as carpet or carpet tile, and in particular, for recycling carpet or carpet tile having a backing, precoat, or adhesive layer containing polyurethanes.

2. Description of the Related Art

Polyurethane resins, which are the reaction products of polyisocyanates and polyols, can be used in a variety of different applications, including in the backing, precoat, or adhesive layers of carpet and carpet tiles. However, the use of virgin polyurethane requires the use and handling of significant quantities of polyisocyanates (as used herein, the term "polyisocyanate" includes diisocyanates, as well as isocyanates having more than two isocyanate moieties), which can cause health and safety problems, and require a high degree of care in handling and disposal. In order to reduce the reliance on virgin polyurethane, and the need for handling of, and exposure to, polyisocyaziates, it would be desirable to reuse polyurethanes in existing carpets and carpet tiles.

Traditional approaches to recycling and reuse have involved separating the individual components to be reused or making do with mixtures of components, which often render the recycled materials suitable for only uses in products of a quality lower than that of the recycled product. Separating individual components of multilayered products, while often more feasible than separating more homogeneous mixtures, can nevertheless present significant difficulties where the layers are held together with adhesive. Often, the separation processes render one or more of the components unusable, or usable only after significant additional processing. For example, processes that involve heating polyurethanes to very high temperatures can often result in irreversible degradation of the polyurethane molecule, in effect "downgrading" it by rendering it unsuitable for recycle or reuse in applications where it will have an equivalent value to virgin polyurethane.

SUMMARY OF THE INVENTION

This invention relates to methods of recycling and reusing floor coverings, such as carpet or carpet tile having polyurethane therein, such as in the secondary backing, or in the precoat locking the fibers into the primary backing, or in the adhesive bonding the primary backing to the secondary backing, or in moisture barrier layers in the product.

The methods of this invention allow the polyurethane to be reused without isolating it from other components in the secondary backing or adhesive, and requires significantly decreased quantities of polyisocyanate.

The methods of this invention can be adapted to continuous recycling of polyurethane-containing carpet components and continuous reuse in preparation or different carpet or carpet tile.

In addition, the invention allows the polyurethane in the floor covering products to be reliquefied at temperatures low enough to avoid significant or irreversible degradation of the polyurethane molecule. This allows the polyurethane to be resolidified easily by addition of isocyanate. The invention can therefore be used to recycle and reuse products in a way that achieves products equivalent in quality to those that are recycled.

More particularly, the invention relates to a method for processing a floor covering, such as carpet or carpet tile, comprising a facecloth layer, a backing layer, and optionally an adhesive or precoat layer, wherein the floor covering comprises at least one layer containing a polyurethane formed by reacting a polyisocyanate and a first organic polyol, comprising:

contacting the floor covering with a second organic polyol (which may, if desired, be the same polyol as the first organic polyol);

heating the floor covering and second organic polyol; and separating facecloth layer from the backing layer.

In one embodiment, this invention relates to a method for recycling or reusing polyurethane-containing carpet or carpet tile, by adding a diol or polyol to the carpet or carpet tile, and heating this mixture to cause reaction between the polyurethane and the diol or polyol. This embodiment of the invention can be advantageously used with either carpet or carpet tile, or scraps thereof.

In another embodiment, this invention relates to a method for recycling or reusing polyurethane-containing carpet or carpet tile, and in particular carpet, by spraying one or more surfaces thereof with diol or polyol, applying heat, and stripping the facecloth (sometimes known as "facecloth") from the backing. Additional material of the type used to form the adhesive or secondary backing, and having additional polyisocyanate, can be applied to the surface of the secondary backing, which can then be adhered to a new facecloth. This embodiment of the invention has the additional advantage that the original facecloth can also be reused by adhering it to a different secondary backing, if desired. No separation of tufted material or facecloth from the primary backing is necessary.

In yet another embodiment, the invention relates to a method for recycling or reusing floor coverings having a foamed polyurethane backing, a moisture-barrier layer containing urethane (such as a urethane-modified bitumen), or both. This method involves contacting the polyurethane or urethane-modified bitumen (or both) with polyol and heating. The method can be used by, e.g., spraying the face cloth of the floor covering with polyol. This method of application can be used even where a latex precoat (e.g., an EVA latex) has been used on the surface of the primary backing or of the facecloth, as the polyol will penetrate the precoat and reach at least the urethane-containing moisture barrier layer.

BRIEF DESCRIPTION OF THE DRAWINGS

This invention can be more clearly understood by reference to the following drawings, which are not intended to limit the scope of the invention in any way.

DETAILED DESCRIPTION OF SPECIFIC EMBODIMENTS

Figure 1:
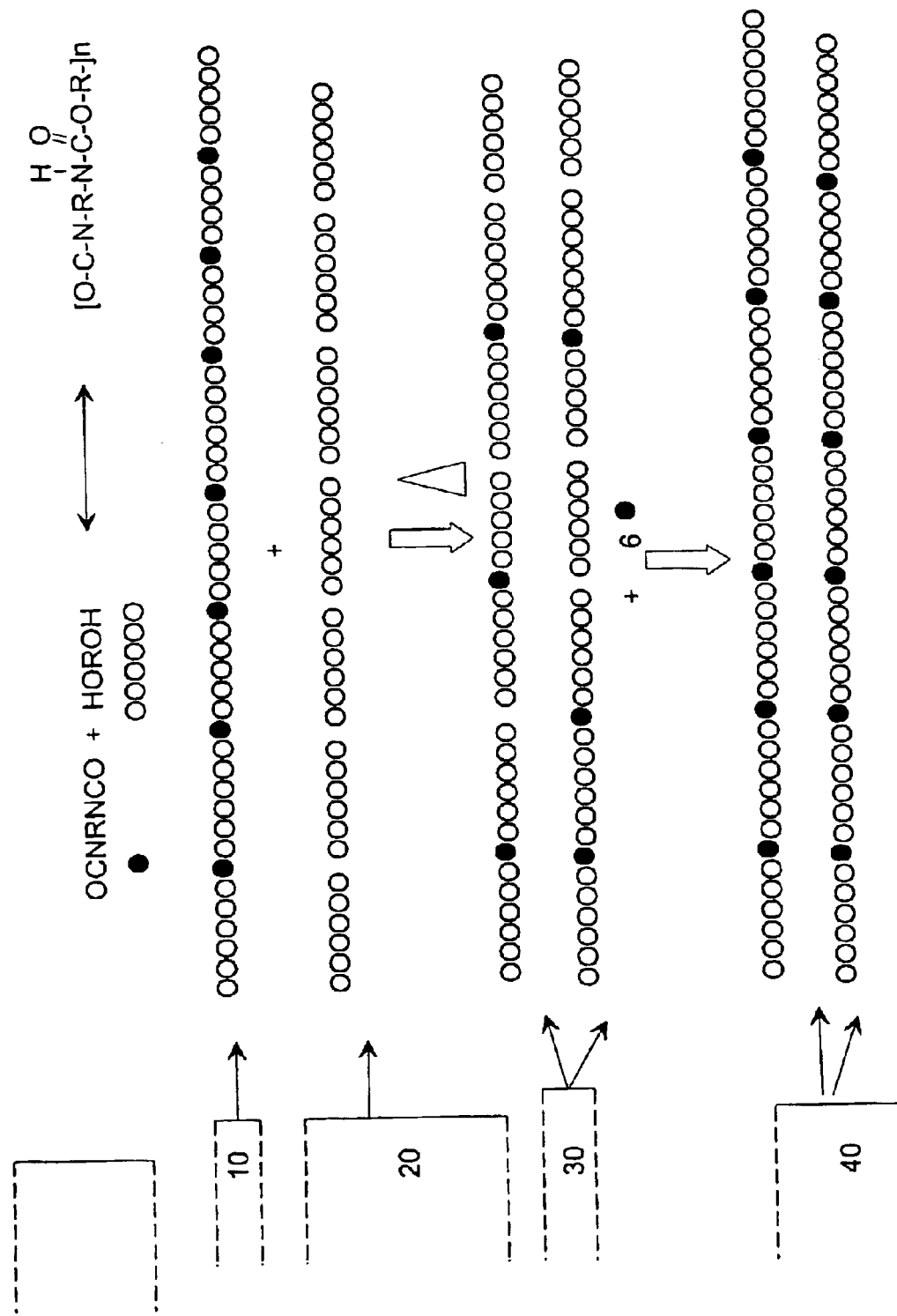
FIG. 1 is a schematic diagram showing reversible polymerization reactions forming polyurethanes, and schematically illustrating the role of the second organic polyol in the invention.

This inventor has found that if a polyurethane material is used as the backing of a floor covering material, such as carpet or carpet tile, whether as part of the backing itself, or in an adhesive or precoat layer which bonds the tufts in place and bonds the facecloth to the backing, or as a moisture barrier or other layer in the floor covering material, or all of these, then there is the potential for a simple separation of components. In particular, it has been found that Polycarbite™, which is a urethane-modified bitumen, and can be thought of as a combination of an asphalt and polyurethane (the chemistry of which is described in U.S. Pat. No. 5,096,764 to Terry et al., which is incorporated herein in its entirety by reference), can be recycled and reused using methods according to this invention. As indicated in FIG. 1, the reaction of a diol with a diisocyanate produces a polyurethane. The reaction is reversible. If, for example, in the case of a Polycarbite™, the polymer is produced using a hydroxy terminated polybutadiene (PolyBD) and methylene para-phenylene diisocyanate (MDI) blended with the asphalt, a solid Polycarbite™ material is obtained.

As used herein, the term "facecloth" refers to the fabric material forming the outermost surface of a floor covering, i.e., the cloth that is typically seen and walked on. As used herein, this term includes material serving as a primary backing (typically a woven or nonwoven fabric into which pile fibers are tufted). The term "backing" refers to material supporting the facecloth, often referred to as a secondary backing (typically a solid, possibly multilayered, polymeric material serving to provide cushioning and dimensional stability to the floor covering material, and typically bonded somehow to the primary backing or facecloth). Often, the undersurface of the primary backing or facecloth is coated with a "precoat," typically a latex, such as EVA, which performs functions such as locking the tufted fibers into place, supporting and releasing biocides and other active ingredients, adhering the primary backing or facecloth to the secondary backing, etc. As explained in more detail below, this invention functions in part by reversibly softening and/or liquefying a layer in the floor covering material that contains polyurethane, so that a layer of material containing the facecloth can be separated from a layer of material containing the backing. This layer may be the secondary backing itself, in which case at least the upper surface thereof is softened and/or partially liquefied and a layer containing the face cloth (and, in the case of tufted facecloth, the primary backing) is removed from the secondary backing. In other cases, the polyurethane-containing layer may be an intermediate layer, such as a urethane-modified bitumen moisture barrier layer. In this situation, the layers below the softened polyurethane-containing layer in the floor covering structure (called herein the "backing-containing layer" or simply the "backing" or "backing layer") would be separated from the layers above the polyurethane-containing layer (called herein the "facecloth-containing layer" or simply the "facecloth" or "facecloth layer"). Accordingly, those skilled in the art will recognize that in describing or claiming the separation of facecloth or a facecloth layer or a facecloth-containing layer from a backing or a backing layer or a backing-containing layer, additional layers of material may be attached or adhered to the facecloth or secondary backing per se, depending upon the position in the floor covering laminate of the polyurethane-containing material that is softened by the process of the invention.

The urethane portion of the material, which provides it with flexibility, is shown as a polymer chain 10 in FIG. 1. When liquid polyol, i.e., the second organic polyol, for example Poly BD, shown schematically in FIG. 1 as liquid molecules 20, is added to the system and heated, the isocyanate will exchange the first organic polyol, bonded to the remainder of the polymer chain, with the second organic polyol and produce shorter chains, which can be liquefied with increasing temperature. These liquid molecules are shown schematically in FIG. 1 as molecules 30. Thus, the heating of the carpet or carpet tile and polyol combination typically at least partially liquefies the polyurethane-containing layer. If additional diisocyanate is then added, the system can be resolidified, shown schematically as a solid polymer chain 40 in FIG. 1. In effect, the system acts as a chemical zipper. It will be understood by those of skill in the art that this schematic representation is merely illustrative of one way in which the solid polymer chain may be softened or liquefied by the polyol, and that other groupings of polyisocyanate and polyol may result.

The methods of this invention can be used with any polyurethane and is not limited to urethane modified bitumens, such as Polycarbite™. In general, it is desirable to use the same polyol to liquefy the solid material as was reacted with the polyisocyanate to form the original polyurethane. For example, with carpet or carpet tile having a polyurethane foam backing, the same polyol can be used to liquefy the backing as was used to form the polyurethane originally. In the case of a foam, the liquefied backing is combined with additional isocyanate and passed through a frothing unit, so that the polyurethane foam can be reformed. With Polycarbite™, by using the Poly BD as the liquefying agent, the solid backing layer can be reformed merely with additional polyisocyanate. This embodiment of this invention is particularly suitable for use in recycling the scraps produced as a consequence of the manufacturing process for making carpet and carpet tile.

In one embodiment of this invention, which is applicable to carpet and carpet tile, as well as scrap material, the recycled floor covering product (e.g. carpet tile) can be shredded and/or ground into smaller pieces, placed in a reactor with organic polyol, and heated. In this embodiment, the polyurethane-containing material, which may be the backing layer, or the precoat or adhesive layer, or both, is at least partially liquefied by heating (in the case of Polycarbite™, to a temperature of approximately 100° C.), the facecloth components and any fibers present (e.g., glass reinforcing scrim) strained out, and the liquefied backing reused in the standard carpet or carpet tile system by adding additional diisocyanate to reform the Polycarbite™ backing.

Another embodiment of this invention is particularly suitable for use with a complete roll of carpet that can be removed from the floor. In this embodiment, illustrated schematically in FIG. 2, the backing is separated from the facecloth by merely spraying additional polyol onto one or more surfaces of the carpet, such as on the facecloth surface. When applied to the facecloth, the attack by the polyol occurs only at the interface between the facecloth-containing layer and the Polycarbite™ or other polyurethane-containing layer. The facecloth-containing layer can, therefore, be stripped away from the backing-containing layer after the application of heat, and the backing-containing layer can be continuously processed in the manufacturing of new carpet or carpet tile, by applying additional Polycarbite™ (with excess isocyanate) and a new facecloth-containing layer: in effect, the backing is reused entirely. New carpet is then produced merely by the addition of a new facecloth and a small quantity of Polycarbite™. The old facecloth can then optionally be cleaned of any residual Polycarbite™ by contacting with solvent, and can be recycled separately. A major advantage of this embodiment is the reuse of the backing directly, with no reprocessing necessary, and the concomitant decrease in use of polyisocyanates.

Figure 2:
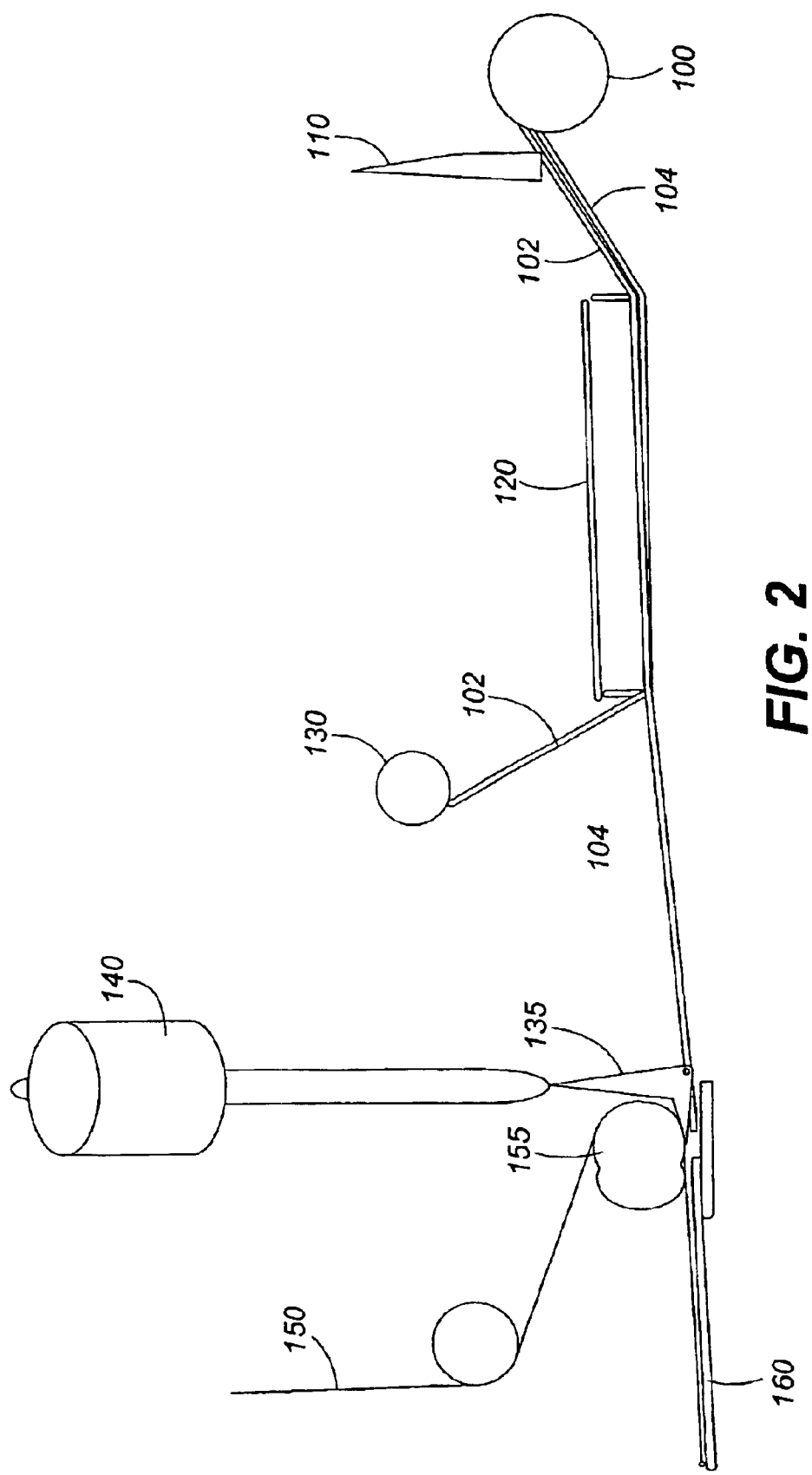
FIG. 2 is a schematic diagram showing a method for separating the facecloth-containing layer from the backing-containing layer of a floor covering, according to one embodiment of this invention.

This embodiment of the invention is shown schematically in FIG. 2. Recycled floor covering material 100, comprising a facecloth-containing layer 102 and a backing-containing layer 104 is contacted with polyol spray 110, desirably on the facecloth-containing side of the floor covering material. The polyol-sprayed floor covering material is then heated by passing it near a heat source, such as a hot plate 120. The material remains sufficiently close to the heat source for a sufficient time to soften and at least partially liquefy the polyurethane in the material according to the mechanisms shown in FIG. 1. The facecloth-containing layer 102 is peeled away from backing-containing layer 104, and collected by roller 130. The backing-containing layer 104 is then contacted with additional polyurethane-containing material 135, such as Polycarbite™ that has been enriched with a slight excess of polyisocyanate, desirably the same diisocyanate used to make the polyurethane material itself applied by applicator 140. A new facecloth-containing layer 150 is then married to the backing-containing layer 104 using, e.g., nip roller 155, to form recycled floor covering product 160. Original facecloth-containing layer 102 can then be separately recycled, e.g., by removing any residual polyurethane containing material from its undersurface (if desired or necessary for the recycling process) and marrying the facecloth or facecloth-containing layer to a backing or backing-containing layer.

This embodiment of the invention can also be used with a standard polyurethane, which can be used directly, since the complete structure is a polyurethane. When the precoat or adhesive layer contains a Polycarbite™, it is particularly important that the polyol used in the reaction be partially soluble in the asphalt, as is the PolyBD. As a result, it is best to use the same polyol as was used to make the original polyurethane structure, since the final structure then becomes equivalent to the original.

Polycarbite™ urethane-modified bitumen has also been used as a moisture barrier layer, as disclosed in U.S. Pat. No. 5,763,036, the entire contents of which are hereby incorporated by reference. The moisture barrier properties of Polycarbite™ urethane-modified bitumen can be used in floor covering products like those described in WO 99/19557, the entire contents of which are hereby incorporated by reference. The floor covering products disclosed in this publication can have a polyurethane resilient backing, a Polycarbite™ urethane-modified bitumen layer, an optional latex precoat, and the floor covering facecloth. The process of the invention is equally applicable to recycling this floor covering product, since a polyol can be sprayed onto the face cloth, and will penetrate the latex precoat and, on heating, liquefy the urethane-modified bitumen layer, and possibly also the polyurethane resilient backing. Additional or a different polyol can be applied to the resilient polyurethane backing if sufficient penetration is not achieved by application to the face cloth and if liquification of the polyurethane resilient backing is desired. However, typically, application of the polyol to the face cloth followed by passing the floor covering over a heat source is sufficient to soften/liquefy the Polycarbite™ urethane-modified bitumen in the moisture barrier or intermediate layer, and the facecloth can be stripped from the backing, as shown in FIG. 2. The recycled backing can then receive, e.g., a new layer of urethane-modified bitumen having excess isocyanate present, and can be bonded to a new facecloth. The original facecloth, with or without removal of the Polycarbite™ urethane-modified bitumen layer, can also be recycled by bonding with a new backing layer.

The amount of polyol added to the floor covering will, to a large extent, need to be determined by routine experiment with the particular floor covering product to be recycled, since different floor coverings will contain different amounts of polyurethane. Generally, the amount of polyol is sufficient to saturate the topcloth (if applied on the topcloth side and reach and soften the urethane-containing layer. If the secondary backing is to be liquefied and refoamed, then sufficient polyol can be directly applied to the secondary backing itself. Generally, the polyol is applied to the floor covering in a way that will allow it to contact the polyurethane-containing layer near the interface between the polyurethane-containing layer and the facecloth, so that the softening/partial liquification of the urethane allows the facecloth to be more easily removed. The temperature to which the polyol treated floor covering is heated during the heating step will also vary to some extent with the amount and type of polyurethane used, but is easily determinable in accordance with the present invention by one of skill in the art using only routine experimentation. Generally, the heating temperature is around 90° C. to about 120° C., more typically, around 100° C. Typically, the temperature to which the polyol-treated floor covering material is heated is well below the normal melting point or decomposition temperature of the polyurethane or of the other materials in the polyurethane-containing layer.

It will be understood by those of skill in the art that the above-described embodiments leave the backing layer essentially intact, allowing it to be recycled as a backing material without significant further processing. However, it is also possible, using the present invention, to more completely liquefy the polyurethane-containing layer for reuse. For example, if the floor covering material has a backing layer containing predominantly polyurethane (e.g., a polyurethane foam), this layer can be contacted with polyol, heated, and liquefied, and the liquefied material contacted with additional polyisocyanate and added to a process for foaming virgin polyurethane into new foamed polyurethane backing. Loadings of recycled polyurethane as high as 20 wt % have been successfully foamed, and higher loadings may be possible.

The invention having been thus described by reference to its general and specific embodiments, it will be clear that other embodiments, modifications, and variations are within the spirit thereof, and are intended to be encompassed within the scope of the appended claims and equivalents thereof.

What is claimed is:

1. A method for processing a floor covering comprising a facecloth layer, a backing layer, and optionally an adhesive or precoat layer, wherein the floor covering comprises at least one layer containing a polyurethane formed by reacting a polyisocyanate and a first organic polyol, which comprises:

contacting the floor covering with a second organic polyol by disposing said second organic polyol onto the facecloth layer of the floor covering, heating the floor covering and second organic polyol by increasing the temperature of the floor covering and second organic polyol sufficiently to at least partially liquefy the polyurethane; and separating the facecloth layer from the backing layer by pulling said facecloth away from said backing layer.

2. The method of claim 1, wherein the backing layer is contacted with a material containing additional polyisocyanate and adhered to a second facecloth, to form a second floor covering.

3. The method of claim 1, wherein the backing layer comprises a urethane-modified bitumen.

4. The method of claim 1, wherein said first and second organic polyols are the same.

5. The method of claim 1, further comprising contacting said facecloth layer with a second backing layer.

6. The method of claim 1, wherein the layer containing the polyurethane is disposed between a precoat layer and the backing layer.

7. The method of claim 1, wherein the backing layer comprises foamed polyurethane, and wherein the backing layer is the layer containing the polyurethane to be liquefied.

8. The method of claim 7, wherein the liquefied polyurethane obtained from the backing layer is refoamed with added polyisocyanate.

9. A method for processing a floor covering comprising a facecloth layer, a backing layer, and optionally an adhesive or precoat layer, wherein the floor covering comprises at least one layer containing a polyurethane formed by reacting a polyisocyanate and a first organic polyol, which comprises:

contacting the floor covering with a second organic polyol;

heating the floor covering and second organic polyol;

separating the facecloth layer from the backing layer; and reconstituting the backing layer by contacting it with additional polyisocyanate.

10. The method of claim 9, wherein said first organic polyol and said second organic polyol are the same.

11. The method of claim 9, wherein said heating comprises increasing the temperature of the floor covering and second organic polyol sufficiently to at least partially liquefy the polyurethane.

12. The method of claim 11, wherein said contacting comprises grinding floor covering into smaller pieces and mixing these pieces with said second organic polyol.

13. The method of claim 12, wherein said polyurethane-containing layer is the backing layer or the adhesive or precoat layer, or both.

14. The method of claim 13, wherein the polyurethane-containing layer comprises a urethane-modified bitumen.

* * * * *